(12) United States Patent
Matsuto et al.

(10) Patent No.: US 11,476,732 B2
(45) Date of Patent: Oct. 18, 2022

(54) ELECTRIC ACTUATOR

(71) Applicant: NTN Corporation, Osaka (JP)

(72) Inventors: Takushi Matsuto, Shizuoka (JP); Akio Kato, Shizuoka (JP); Atsushi Ikeda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 231 days.

(21) Appl. No.: 16/762,588

(22) PCT Filed: Nov. 27, 2018

(86) PCT No.: PCT/JP2018/043610
§ 371 (c)(1),
(2) Date: May 8, 2020

(87) PCT Pub. No.: WO2019/103159
PCT Pub. Date: May 31, 2019

(65) Prior Publication Data
US 2020/0336038 A1    Oct. 22, 2020

(30) Foreign Application Priority Data

Nov. 27, 2017 (JP) ............................. JP2017-226804
Nov. 22, 2018 (JP) ............................. JP2018-219284

(51) Int. Cl.
*H02K 5/10*    (2006.01)
*H02K 11/33*   (2016.01)
*H02K 7/00*    (2006.01)

(52) U.S. Cl.
CPC ................. *H02K 5/10* (2013.01); *H02K 7/00* (2013.01); *H02K 11/33* (2016.01)

(58) Field of Classification Search
CPC .. F16H 1/16; F16H 1/28; F16H 25/20; H02K 11/20; H02K 11/33; H02K 5/04;
(Continued)

(56) References Cited

U.S. PATENT DOCUMENTS

2007/0227850 A1* 10/2007 Heravi .................... F16D 28/00
                                                          192/84.6
2012/0227524 A1    9/2012 Takahashi et al.
(Continued)

FOREIGN PATENT DOCUMENTS

JP    2000-39051    2/2000
JP    2008-304062   12/2008
(Continued)

OTHER PUBLICATIONS

International Search Report dated Feb. 5, 2019 in International (PCT) Application No. PCT/JP2018/043610.
(Continued)

*Primary Examiner* — Naishadh N Desai
(74) *Attorney, Agent, or Firm* — Wenderoth, Lind & Ponack, L.L.P.

(57) ABSTRACT

An electric actuator includes: an electric motor 2, a relay circuit 3 that switches ON/OFF of power supply to the electric motor 2, a motion conversion mechanism 4 that converts a rotary motion of the electric motor 2 into a motion in a direction different therefrom and outputs the motion, and a housing 1. The housing 1 is configured by joining two housing split bodies 1*a* and 1*b* to each other, and in an internal space formed by joining the two housing split bodies 1*a* and 1*b*, the electric motor 2, the relay circuit 3, and the motion conversion mechanism 4 are housed.

8 Claims, 5 Drawing Sheets

(58) Field of Classification Search
CPC .. H02K 5/10; H02K 7/00; H02K 7/06; H02K 7/116; H02K 7/1166; H02K 5/00; H03G 3/001
See application file for complete search history.

(56) References Cited

U.S. PATENT DOCUMENTS

2014/0069155 A1   3/2014  Laval et al.
2015/0075156 A1*  3/2015  Nakano ................ B60T 11/103
                                                              60/545

FOREIGN PATENT DOCUMENTS

| JP | 2011-114921 | | | 6/2011 | |
|---|---|---|---|---|---|
| JP | 2013533399 A | * | | 8/2013 | |
| JP | 2013-219949 | | | 10/2013 | |
| JP | 2015-58820 | | | 3/2015 | |
| WO | 2005/057051 | | | 6/2005 | |
| WO | WO-2013125581 A1 | * | 8/2013 | ............... | B60K 6/40 |

OTHER PUBLICATIONS

International Preliminary Report on Patentability and Written Opinion of the International Searching Authority dated Jun. 2, 2020 in International (PCT) Application No. PCT/JP2018/043610.
Extended European Search Report dated Jul. 29, 2021 in corresponding European Patent Application No. 18880283.9.

* cited by examiner

ELECTRIC ACTUATOR

TECHNICAL FIELD

The present invention relates to an electric actuator.

BACKGROUND ART

In recent years, electrification of vehicles and the like has been promoted for power saving and reduction in fuel consumption. For example, a system for operating an automatic transmission, a brake, a steering wheel, and the like of the automobile with use of power of an electric motor has been developed and brought to the market.

As an electric actuator used for such a purpose, for example, Patent Literature 1 proposes a so-called electromechanical integrated electric actuator in which a drive component such as an electric motor and an electronic component for controlling the drive component are integrally assembled. Specifically, in the configuration described in Patent Literature 1, a box-shaped case is provided in a housing in which an electric motor or the like is mounted, and an electronic component for controlling driving of the electric motor is housed in the case. As a result, the drive component and the electronic component are integrally assembled.

CITATION LIST

Patent Literature 1: JP 2015-58820 A

SUMMARY OF INVENTION

Technical Problem

However, in the configuration described in Patent Literature 1, since the electronic component is housed in a space different from the space of the drive component, when taking dustproof or waterproof measures for both the drive component and the electronic component, it is necessary to individually seal the spaces where they are arranged. As described above, when the electronic component is housed in a space different from the space of the drive component, the number of sealing points increases, so that the number of sealing materials required for sealing increases, the assembly work becomes complicated, and the number of sealing inspection points also increases, resulting in a problem that the cost of the electric actuator is increased.

Therefore, it is an object of the present invention to provide an electric actuator that can reduce the number of sealing points and reduce the cost.

Solutions to Problem

In order to solve the above problem, the present invention is an electric actuator including: an electric motor, a relay circuit that switches ON/OFF of power supply to the electric motor, a motion conversion mechanism that converts a rotary motion of the electric motor into a motion in a direction different therefrom and outputs the motion, and a housing, wherein the housing is configured by joining two housing split bodies to each other, and in an internal space formed by joining the two housing split bodies, the electric motor, the relay circuit, and the motion conversion mechanism are housed.

As described above, with the electric actuator according to the present invention, when the electric motor and the motion conversion mechanism, which are drive components, and the relay circuit, which is an electronic component, are housed in the internal space formed by joining the two housing split bodies, it is possible to reduce the number of points where sealing needs to be ensured, as compared with a configuration in which the drive component and the electronic component are arranged in different spaces. This can reduce the number of sealing structures, sealing operations, and inspections necessary for ensuring the sealing, so that the cost of the electric actuator can be reduced. In addition, since the number of sealing points is reduced, the possibility of entry of a foreign material into the inside is also reduced, so that reliability regarding dustproofness or waterproofness is also increased.

In addition, in the case where the electric actuator according to the present invention includes a speed reducer that transmits the rotation from the electric motor to the motion conversion mechanism at a reduced speed, the speed reducer may be housed in the internal space formed by joining the two housing split bodies, in addition to the electric motor, the relay circuit, and the motion conversion mechanism.

In particular, it is desirable that all the other constituent components (other than the housing split bodies) be housed in the internal space formed by joining the two housing split bodies. In this case, only by sealing the two housing split bodies, it is possible to ensure the dustproofness or waterproofness for all the constituent components, so that the cost required for sealing can be more effectively reduced, and the reliability for the dustproofness or waterproofness is further increased.

In addition, by providing a partition between the space in which the electric motor and the relay circuit are housed and the space in which the motion conversion mechanism is housed, it is possible to prevent a foreign material such as abrasion powder and grease from the motion conversion mechanism from being adhered to the relay circuit. Thus, it is possible to avoid the possibility of malfunction or failure due to a foreign material attached to the relay circuit.

The relay circuit may be a contact type relay circuit or may be a non-contact type relay circuit.

In addition, in order to increase the sealing between the joint surfaces, a sealing structure may be provided between the joint surfaces of the housing split bodies.

It is preferable that the joint surfaces of the housing split bodies be formed in the same plane. By forming the joint surfaces in the same plane, even if there is some misalignment between the joint surfaces of the housing split bodies during assembly, a gap is hardly generated between the joint surfaces, so that the sealing becomes easy to ensure.

In addition, the present invention is applicable to, for example, an electric actuator in which an output portion of a motion conversion mechanism rotates in a forward direction or in a backward direction in a direction different from that of the rotary motion of the electric motor.

Advantageous Effects of Invention

According to the present invention, it is possible to provide an electric actuator that can reduce the number of sealing points and reduce the cost.

DESCRIPTION OF EMBODIMENTS

Figure 1:
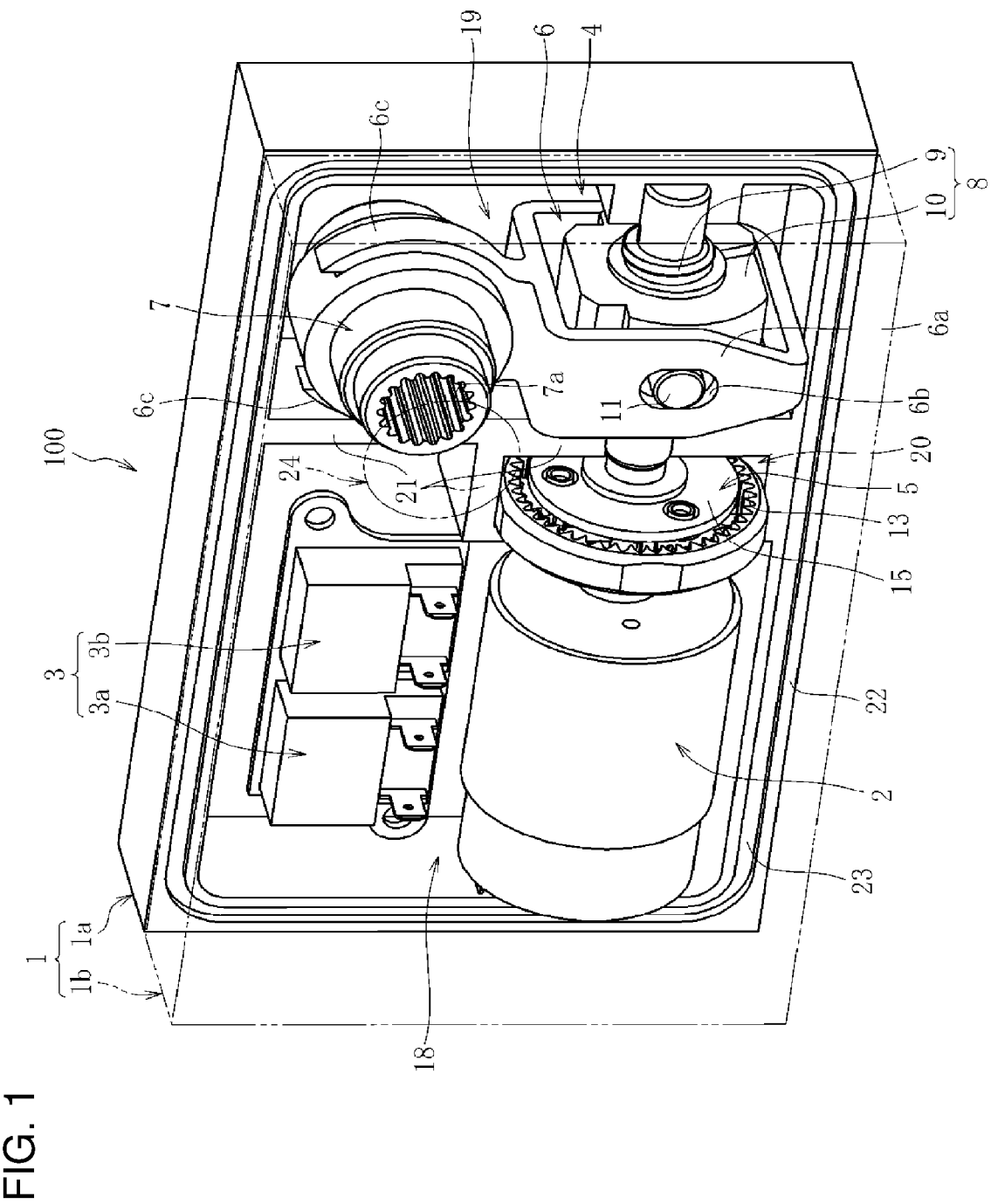
FIG. 1 is a perspective view illustrating an internal structure of an electric actuator according to an embodiment of the present invention.

Hereinafter, the present invention will be described with reference to the accompanying drawings. In each of the drawings for describing the present invention, constituent elements such as members and constituent components having the same function or shape are denoted by the same reference numerals insofar as they can be distinguished, and once described, the description is omitted.

Figure 2:
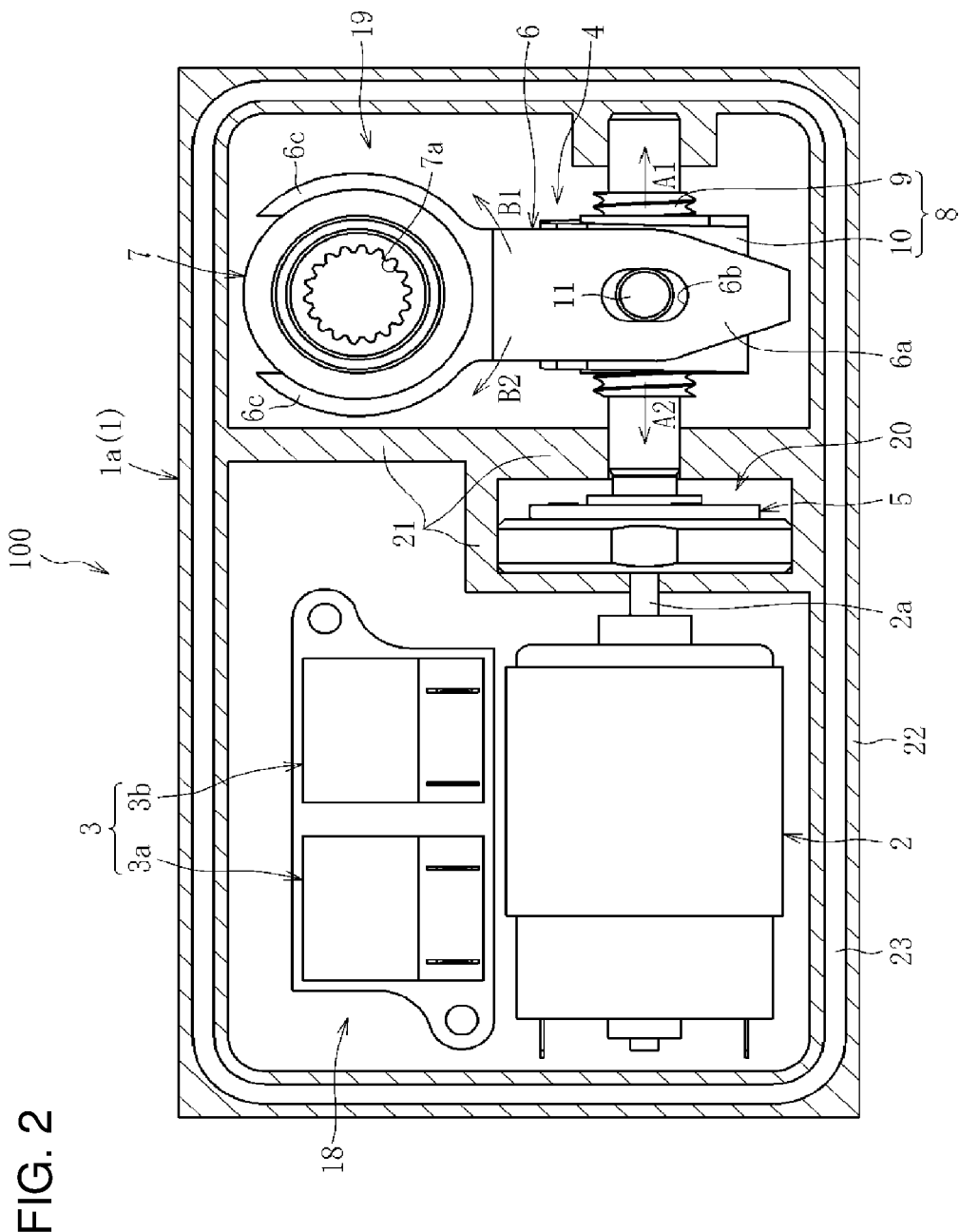
FIG. 2 is a front view illustrating the internal structure of the electric actuator illustrated in FIG. 1.

FIG. 1 is a perspective view illustrating the internal structure of the electric actuator according to an embodiment of the present invention, and FIG. 2 is a front view illustrating the internal structure of the electric actuator illustrated in FIG. 1.

As illustrated in FIGS. 1 and 2, an electric actuator 100 according to the present embodiment includes, as main configurations, an electric motor 2, a relay circuit 3 for switching ON/OFF of power supply to the electric motor 2, a motion conversion mechanism 4 that converts a rotary motion of the electric motor 2 into a motion in a direction different therefrom and outputs the motion, a speed reducer 5 that transmits rotation from the electric motor 2 to the motion conversion mechanism 4 at a reduced speed, and a housing 1 that houses all of them.

The motion conversion mechanism 4 includes a linear motion conversion mechanism 8 that converts a rotary motion into a linear motion, a swing member 6 that converts a linear motion into a rotary motion, and an output portion 7. In the present embodiment, a sliding screw mechanism is used as the linear motion conversion mechanism 8. The sliding screw mechanism includes a screw shaft 9 having a thread groove formed on an outer peripheral surface, and a cylindrical nut 10 having a thread groove, which is screwed to the screw shaft 9, on an inner peripheral surface. Both ends of the screw shaft 9 are rotatably supported by the housing 1. Note that a ball screw mechanism may be used instead of the sliding screw mechanism. When the electric motor 2 rotates forward or backward, and the rotary motion is transmitted to the screw shaft 9 via the speed reducer 5, the screw shaft 9 rotates forward or backward, and accordingly, the nut 10 moves forward or backward in the axial direction to convert the rotary motion into a linear motion.

The swing member 6 is coupled to the nut 10 of the above-mentioned sliding screw mechanism. Specifically, the nut 10 is inserted into a rectangular frame portion 6a of the swing member 6, and a pin-shaped coupling member 11 is attached to the nut 10 through a long hole 6b provided in the frame portion 6a. Thus, the swing member 6 is swingably coupled to the nut 10 around the coupling member 11. In addition, the swing member 6 has a pair of arms 6c that are bifurcated. The tubular output portion 7 is held by these arms 6c.

When the screw shaft 9 is rotated forward or backward by the electric motor 2, and the nut 10 moves in A1 direction or A2 direction in FIG. 2, the swing member 6 thus swings in B1 direction or B2 direction in FIG. 2, the output portion 7 rotates in the forward direction or in the backward direction within a predetermined angle range around the axis thereof. On the inner peripheral surface of the output portion 7, a spline 7a extending in the axial direction is formed. A spline shaft (operation shaft) provided on a used device, which is not illustrated, to be operated is coupled to the inner peripheral surface on which the spline 7a is formed.

The speed reducer 5 is coupled to the electric motor 2 and the motion conversion mechanism 4 therebetween. In the present embodiment, as the speed reducer 5, a planetary gear speed reducer illustrated in FIG. 3 is used.

Figure 3:
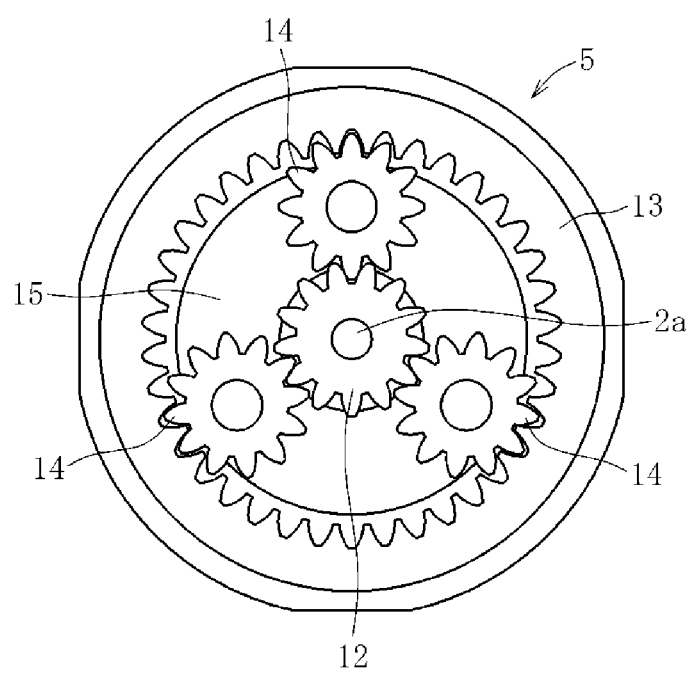
FIG. 3 is a diagram illustrating a configuration of a speed reducer.

As illustrated in FIG. 3, the speed reducer 5 includes a sun gear 12 as an input rotary body, a ring gear 13 as a track ring arranged on the outer periphery of the sun gear 12, a plurality of planetary gears 14 as a planetary rotary body rotatably arranged between the sun gear 12 and the ring gear 13, and a carrier 15 as an output rotary body that holds each planetary gear 14.

The sun gear 12 is fixed to a rotary shaft 2a of the electric motor 2, and rotates integrally with the rotary shaft 2a of the electric motor 2. The ring gear 13 is fixed so as not to rotate with respect to the housing 1. The plurality of planetary gears 14 is arranged between the sun gear 12 and the ring gear 13 and mounted so as to mesh with them. In addition, each planetary gear 14 is rotatably attached to the carrier 15 by a pin or the like. The carrier 15 is fixed to one end of the screw shaft 9 of the motion conversion mechanism 4 (see FIG. 1), and is configured to rotate integrally with the screw shaft 9.

In the speed reducer 5 configured as described above, when the electric motor 2 starts driving and the sun gear 12 rotates, the plurality of planetary gears 14 revolves along the ring gear 13 while rotating. Thus, the carrier 15 rotates at a reduced speed. Then, when the rotary motion at a reduced speed is transmitted to the screw shaft 9 of the motion conversion mechanism 4, the output portion 7 is rotated by the above-described operation of the screw shaft 9, the nut 10, and the swing member 6.

The relay circuit 3 is a contact type relay circuit, and includes a forward rotation relay circuit 3a for applying a forward direction current to the electric motor 2 to rotate the electric motor 2 in the forward direction and a backward rotation relay circuit 3b for applying, a backward direction current to the electric motor 2 to rotate the electric motor 2 in the backward direction.

Figure 4:
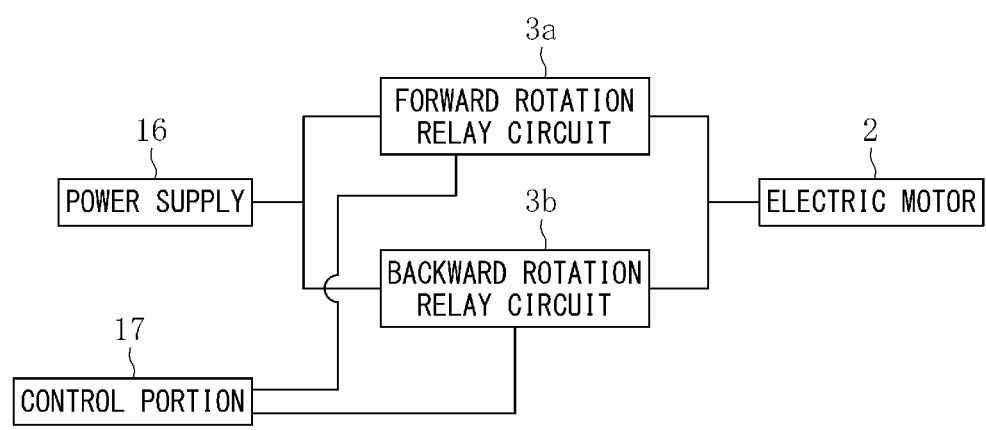
FIG. 4 is a block diagram illustrating an electrical configuration of the electric actuator illustrated in FIG. 1.

As illustrated in FIG. 4, each of the relay circuits 3a and 3b is connected between a power supply 16 and the electric motor 2, and has a contact for switching ON/OFF for power supply to the electric motor 2 in response to a signal from a control portion 17 including a CPU or the like. In addition, in the present embodiment, a brushed DC motor is used as the electric motor 2. In a state where the contacts of the relay circuits 3a and 3b are both in an OFF state, power is not supplied from the power supply 16 to the electric motor 2, and the electric motor 2 is in a stopped state. In this state, when the contact of the forward rotation relay circuit 3a is switched to an ON state by a signal from the control portion 17, a forward direction current flows from the power supply 16 to the electric motor 2, and the electric motor 2 is rotated forward. In addition, in a state where the contacts of the relay circuits 3a and 3b are both in an OFF state, when the contact of the backward rotation relay circuit 3b is switched to an ON state by a signal from the control portion 17, a backward direction current flows from the power supply 16 to the electric motor 2, and the electric motor 2 is rotated backward. By switching the contacts of the relay circuits 3a and 3b in this manner, the electric motor 2 is rotated forward or backward, and the nut 10 of the sliding screw mechanism is moved forward or backward by the above-described operation.

As illustrated in FIG. 1, the housing 1 is split into two parts, and two housing split bodies 1a and 1b are joined to each other. In each of the housing split bodies 1a and 1b, a first housing portion 18 in which the electric motor 2 and the relay circuit 3 are housed, a second housing portion 19 in which the motion conversion mechanism 4 is housed, and a third housing portion 20 in which the speed reducer 5 is housed are formed. In addition, each of the housing split bodies 1a and 1b is provided with a partition 21 for partitioning the housing portions 18, 19, and 20 from one another. As described above, in the present embodiment, when the two housing split bodies 1a and 1b are joined to each other, three space portions (the first housing portion 18, the second housing portion 19, and the third housing portion 20) partitioned by the partition 21 are formed between the two housing split bodies 1a and 1b.

The hatched portion in FIG. 2 is joint surfaces that come into contact with each other when the two housing split bodies 1a and 1b are joined together. Although FIG. 2 illustrates only the joint surface of one housing split body 1a, the joint surface of the other housing split body 1b is similarly formed. In the present embodiment, the joint surface is formed by an outer peripheral edge portion 22 and the partition 21 of each of the housing split bodies 1a and 1b. In addition, a sealing groove 23 for mounting or applying a sealing material (not illustrated) is provided across the entire of the outer peripheral edge portion 22 (joint surface) of the one housing split body 1a.

As the sealing material, a solid sealing material such as an O-ring, a rubber sheet, a resin sheet, a joint sheet, a metal gasket, or the like, or a liquid sealing material such as a liquid gasket or the like can be employed.

Accordingly, when the constituent components including the electric motor 2, the relay circuit 3, the motion conversion mechanism 4, and the speed reducer 5 are housed in the housing portions 18, 19, and 20 of the one housing split body 1a, the sealing material is mounted on or applied to the sealing groove 23, and the housing split bodies 1a and 1b are joined to each other using a fixing tool, which is not illustrated, the joint surfaces are sealed by the sealing material. This prevents a foreign material such as dust and water from entering the housing 1. In addition, in FIG. 1, a through-hole 24 is formed in the housing split body 1b illustrated on the front side through which the spline shaft (operation shaft) provided in the used device is inserted and coupled to the output portion 7. However, the gap between the through-hole 24 and the spline shaft (operation shaft) is sealed by another sealing material.

As described above, in the present embodiment, since all the constituent components (except the housing) of the electric actuator are configured to be housed in the split housing 1, only by providing a sealing structure (in the present embodiment, the sealing groove and the sealing material) on the outer peripheral edge portion of the housing 1, dustproofness or waterproofness of all the constituent components can be ensured. That is, in the internal space formed by joining the two housing split bodies 1a and 1b, the relay circuit 3, which is an electronic component, is housed together with the drive components including the electric motor 2, the motion conversion mechanism 4 and the speed reducer 5. Therefore, as compared with the configuration described in Patent Literature 1 above in which the electronic component and the drive component are arranged in different spaces, the number of points that need to secure the sealing is reduced. Thus, the number of sealing structures, sealing operations, and inspections required for ensuring sealing can be reduced.

In addition, in the present embodiment, since the joint surfaces of the housing split bodies 1a and 1b are formed in the same plane without steps, even if a slight misalignment occurs between the joint surfaces of the housing split bodies during assembly, a gap is hardly formed between the joint surfaces, and it is easy to secure the sealing. Note that, as long as the sealing can be ensured, a step may be present on the joint surfaces.

In addition, in the present embodiment, since the space between the housing portion (the first housing portion 18) in which the electric motor 2 and the relay circuit 3 are housed and the other housing portions (the second housing portion 19 and the third housing portion 20) in which the motion conversion mechanism 4 or the speed reducer 5 is housed is partitioned by the partition 21, it is possible to prevent a foreign material such as abrasion powder and grease from the motion conversion mechanism 4 or the speed reducer 5 from adhering to the relay circuit 3. Thus, it is possible to avoid the possibility of malfunction or failure due to a foreign material adhering to the relay circuit 3.

Next, another embodiment of the present invention will be described on the basis of FIG. 5. Description will be given mainly of a portion different from the above-described embodiment, and because the other portions are basically the same, description thereof will be omitted.

Figure 5:
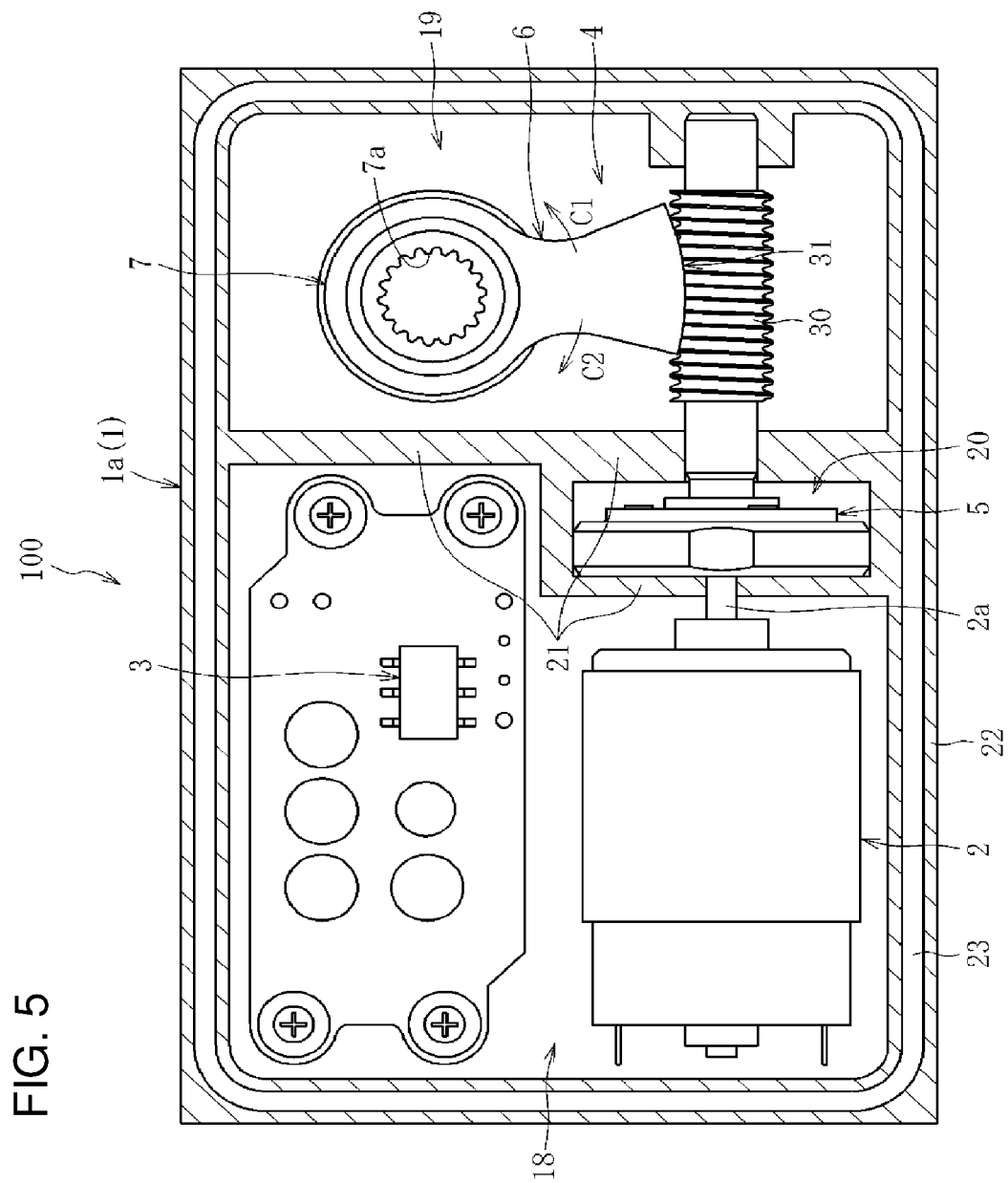
FIG. 5 is a front view illustrating an internal structure of an electric actuator according to another embodiment of the present invention.

As illustrated in FIG. 5, an electric actuator 100 according to another embodiment includes a non-contact type relay circuit 3 using a MOS-FET or the like as the relay circuit 3. In the case of the non-contact type relay circuit 3, since the switching operation can be electrically performed using a semiconductor element, there is an advantage that the durability is superior to the contact type relay circuit that performs the switching operation mechanically. On the other hand, since the contact type relay circuit is inexpensive, it is possible to reduce the cost of the electric actuator.

In addition, in the electric actuator 100 according to another embodiment, the motion conversion mechanism 4 is constituted by a worm gear mechanism having a worm (screw gear) 30 and a cam gear 31 meshing with the worm 30 instead of the above-described sliding screw mechanism. In the present embodiment, the cam gear 31 is formed integrally with the swing member 6, and when the worm 30 rotates forward or backward by driving of the electric motor 2, the swing member 6 swings in C1 direction or C2 direction in FIG. 5. Thus, similar to the above-described embodiment, the output portion 7 rotates in the forward direction or in the backward direction around the axis within a predetermined angle range.

Thus, in the electric actuator according to the present invention, as the motion conversion mechanism 4, a worm gear mechanism can be employed instead of the sliding screw mechanism. In addition, the relay circuit 3 is not limited to a contact type, but may be a non-contact type. In addition, the combination of the type of the relay circuit 3 and the type of the motion conversion mechanism 4 used in the electric actuator can be changed as appropriate. For example, in addition to the combinations described in the above embodiments, the electric actuator according to the present invention may include a non-contact type relay circuit 3 and a sliding screw motion conversion mechanism 4, or may include a contact type relay circuit 3 and a worm gear motion conversion mechanism 4.

In addition, the present invention can, of course, be carried out in various other forms without departing from the gist of the invention.

In the above-described embodiments, the sealing groove 23 is provided on one of the pair of housing split bodies, but the sealing groove may not be provided on any of the housing split bodies. In this case, it is possible to ensure the sealing by mounting a sheet-like sealing material or applying a liquid sealing material between the pair of housing split bodies.

In addition, in the above embodiments, as the electric motor, an inexpensive brushed DC motor is used, but another electric motor such as a brushless motor may be used. In addition, the speed reducer is not limited to the planetary gear speed reducer, but may be, for example, a cycloidal speed reducer. In addition, if not necessary, the speed reducer may be omitted, and the speed reducer may not be provided.

REFERENCE SIGNS LIST

1 Housing
1a Housing split body
1b Housing split body
2 Electric motor
3 Relay circuit
4 Motion conversion mechanism
5 Speed reducer
6 Swing member
7 Output portion
21 Partition
23 Sealing groove
100 Electric actuator

The invention claimed is:

1. An electric actuator comprising:
   an electric motor;
   a relay circuit configured to switch ON/OFF power supplied to the electric motor;
   a motion conversion mechanism configured to convert a rotary motion of the electric motor to a motion in a direction different therefrom and output the motion; and
   a housing, wherein
   the housing includes two housing split bodies configured to be joined to each other, and
   in an internal space formed by joining the two housing split bodies, the electric motor, the relay circuit, and the motion conversion mechanism are housed,
   the housing further includes a partition provided between a space in which the electric motor and the relay circuit are housed and a space in which the motion conversion mechanism is housed, and
   the partition is joined to an outer peripheral edge portion of the housing.

2. The electric actuator according to claim 1, further comprising a speed reducer that transmits rotation from the electric motor to the motion conversion mechanism at a reduced speed,
   wherein the speed reducer is housed in the internal space formed by joining the two housing split bodies, in addition to the electric motor, the relay circuit, and the motion conversion mechanism.

3. The electric actuator according to claim 1, wherein all other constituent components are housed in the internal space formed by joining the two housing split bodies.

4. The electric actuator according to claim 1, wherein the relay circuit is a contact type relay circuit.

5. The electric actuator according to claim 1, wherein the relay circuit is a non-contact type relay circuit.

6. The electric actuator according to claim 1, further comprising a sealing structure provided between joint surfaces of the housing split bodies.

7. The electric actuator according to claim 1, wherein joint surfaces of the housing split bodies are formed in a same plane.

8. The electric actuator according to claim 1, wherein the motion conversion mechanism has an output portion that performs a rotary motion in a forward direction or in a backward direction that are different from a direction of the rotary motion of the electric motor.

* * * * *